(143.)

JOHN H. FENTON.
Improvement in Roller Skates.

No. 122,376.

Patented Jan. 2, 1872.

Witnesses:
E. Wolff.
Francis McArdle

Inventor:
J. H. Fenton.
Per
Attorneys.

122,376

UNITED STATES PATENT OFFICE.

JOHN H. FENTON, OF INDIANAPOLIS, INDIANA.

IMPROVEMENT IN ROLLER-SKATES.

Specification forming part of Letters Patent No. 122,376, dated January 2, 1872.

Specification describing a certain Improved Roller-Skate, invented by JOHN H. FENTON, of Indianapolis, in the county of Marion and State of Indiana.

This invention relates to a new construction and arrangement of devices whereby wheels or rollers are attached to the foot-support of a skate in such a manner as to enable the performer to execute all of the varied evolutions of skating on a smooth floor by the same or a similar motion of the body as that employed in propelling the skater on ice.

Figure 1:
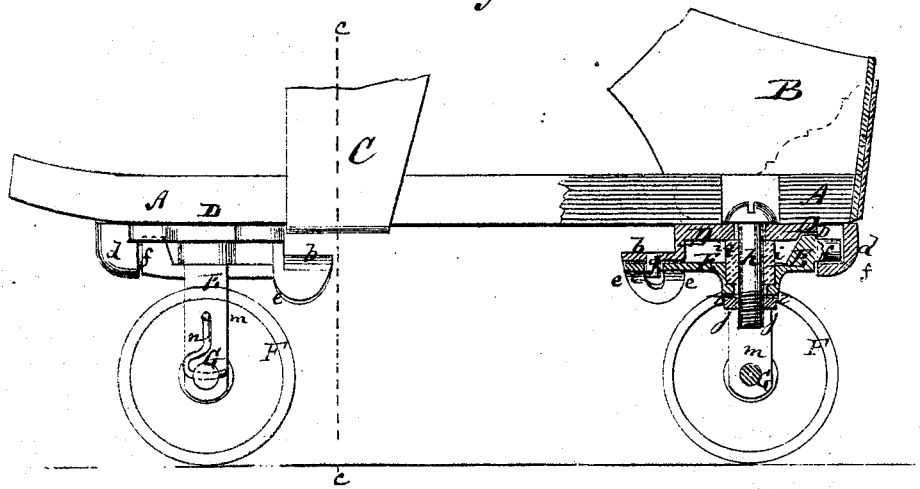
Figure 2:
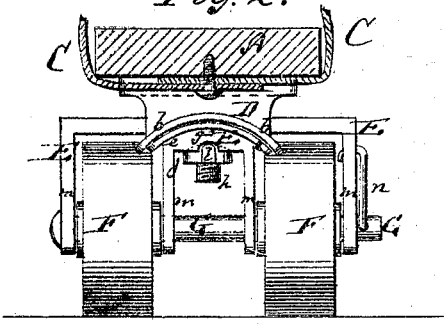
Figure 3:
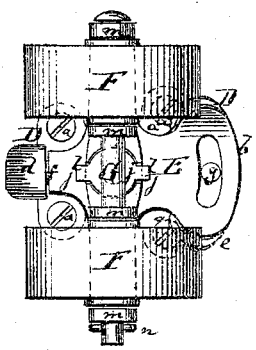
Figure 4:
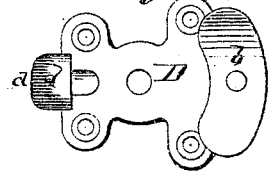

In the accompanying drawing, Figure 1 is a side elevation, partly in section, of my improved roller-skate. Fig. 2 is a vertical transverse section of the same, the line $c\ c$, Fig. 1, indicating the plane of section. Fig. 3 is a bottom view of the roller-frame or hanger. Fig. 4 is a bottom view of the saddle-plate.

Similar letters of reference indicate corresponding parts.

A in the drawing represents the foot-support of the skate. B is the heel-strap and brass plate; C, the toe-strap; all these parts being of suitable kind and style. To the under side of the foot-support is attached, by screws $a\ a$, the saddle-plate D, comprising the segmental concave bearing $b$ and a socket, $d$. E is the roller-frame or hanger, comprising the segmental convex bearing $e$ and the projecting pivot $f$, which correspond respectively with and work in the concave bearing $b$ and socket $d$. The convex bearing $e$ on the hanger-frame is slotted, and through the slot passes a pintle, $g$, that projects downward from the concave plate $b$ of the saddle and guides the movable hanger-frame in a regular direction; also serving as a check in preventing the bearing $e$ from traveling too far. $h$ is a screw which passes through the foot-support and the saddle-plate, its head resting on the top of the latter; also through a rubber cushion, $i$, and the roller-frame E, and is secured at the bottom by a nut, $j$. This nut is provided with projecting pins or trunnions $l\ l$, which rest in corresponding grooves in the under side of the hanger, which, when it vibrates on its pivot $f$, will rock also on said trunnions of the nut and thus have the necessary freedom of motion. F F are the wheels or rollers, hung on an axle, G, which is secured in projecting ears $m\ m$ of the hanger. $n$ is a hooked wire which holds the axle G in place, preventing longitudinal displacement by passing through a hole in the end of the same. This wire is secured at its upper part by passing through an ear or leg, $m$, of the hanger E, and being bent downward on the inside thereof, as shown in Fig. 2. Its lower end is passed through the axle. Being suspended in a line beyond the center of the axle G, the wire is retained in its proper place by its greater weight at the lower end, compelling it always to seek a perpendicular, thus effecting a very neat, cheap, and secure fastening for the axle. The rubber cushion $i$ is interposed between the hanger-frame and saddle, being let into a cavity or box of the hanger, as shown in Fig. 1. It yields to the side pressure of said box, and, acting in its natural manner, returns the hanger to its original position when the pressure is removed.

Having thus described my invention, what I claim as new, and desire to secure by Letters Patent, is—

1. The saddle-plate D, having the concave segmental bearing $b$, pintle $g$, and socket $d$, substantially as herein shown and described.

2. The wheel-frame or hanger F, slotted, and provided with the convex segmental bearing $e$, pivot $f$, and rubber cushion $i$, substantially as and for the purpose herein shown and described.

JOHN H. FENTON.

Witnesses:
JOHN FENTON,
J. G. LIGHTFORD.

(143)